(12) United States Patent
Bates et al.

(10) Patent No.: US 6,889,361 B1
(45) Date of Patent: May 3, 2005

(54) EDUCATIONAL SPELL CHECKER

(75) Inventors: Cary Lee Bates, Rochester, MN (US); Paul Reuben Day, Rochester, MN (US)

(73) Assignee: International Business Machines Corporation, Armonk, NY (US)

(*) Notice: Subject to any disclaimer, the term of this patent is extended or adjusted under 35 U.S.C. 154(b) by 813 days.

(21) Appl. No.: 09/593,176

(22) Filed: Jun. 13, 2000

(51) Int. Cl.[7] ............................................. G06F 15/00
(52) U.S. Cl. ................................... 715/533; 715/530
(58) Field of Search ................................ 715/533, 530, 715/500

(56) References Cited

U.S. PATENT DOCUMENTS

| | | | | |
|---|---|---|---|---|
| 4,863,296 A | * | 9/1989 | Yamakawa et al. | 400/63 |
| 5,215,388 A | * | 6/1993 | Shibaoka | 400/63 |
| 5,572,423 A | * | 11/1996 | Church | 715/533 |
| 5,604,897 A | * | 2/1997 | Travis | 715/533 |
| 5,761,689 A | * | 6/1998 | Rayson et al. | 715/533 |
| 5,787,451 A | * | 7/1998 | Mogilevsky | 715/533 |
| 5,812,863 A | * | 9/1998 | Ishikawa | 715/533 |
| 5,875,443 A | * | 2/1999 | Nielsen | 707/2 |
| 5,940,847 A | * | 8/1999 | Fein et al. | 715/540 |
| 6,003,023 A | | 12/1999 | Schmidt | 707/3 |
| 6,044,387 A | * | 3/2000 | Angiulo et al. | 715/533 |
| 6,047,300 A | * | 4/2000 | Walfish et al. | 715/533 |
| 6,085,206 A | * | 7/2000 | Domini et al. | 715/533 |
| 6,131,102 A | * | 10/2000 | Potter | 715/533 |
| 6,424,983 B1 | * | 7/2002 | Schabes et al. | 715/533 |
| 6,460,074 B1 | * | 10/2002 | Fishkin | 709/206 |
| 6,507,831 B1 | * | 1/2003 | Varma et al. | 706/48 |
| 6,636,849 B1 | * | 10/2003 | Tang et al. | 707/6 |
| 6,799,301 B1 | * | 9/2004 | Francis et al. | 715/523 |
| 6,801,190 B1 | * | 10/2004 | Robinson et al. | 345/173 |
| 2002/0010726 A1 | * | 1/2002 | Rogson | 707/533 |

OTHER PUBLICATIONS

Kraynak, The Complete Idiots Guide to Microsoft Office 2000, eBook 1999, Ind. Alpha Books, pp. 70–71.*
Camarda et al., Using Microsoft Word 2000, eBook 1999, Ind. Que, p. 214.*
Peterson, Computer Programs for Detecting and Correcting Spelling Errors, ACM 1980, pp. 676–687.*
Cherkassky et al., Conventional and associative memory-based spelling checkers, IEEE Nov. 1990, pp. 138–144.*
Pollock et al., Automatic spelling correction in scientific and scholarly text, ACM 1984, pp. 358–368.*
Turba et al., Checking for spelling and typographical errors in computer-based text, ACM 1981, pp. 51–60.*

* cited by examiner

*Primary Examiner*—Stephen Hong
*Assistant Examiner*—Cong-Lac Huynh
(74) *Attorney, Agent, or Firm*—Moser, Patterson & Sheridan, LLP

(57) ABSTRACT

Method and apparatus for improving a user's ability to spell words correctly are provided. The method comprises: displaying a word list for user selection of a correctly spelled word; and displaying assistance information associated with the correctly spelled word. In one embodiment, the assistance information is selected from: one or more root words, one or more related words, and one or more memorization clues. The apparatus may comprise a signal bearing medium containing instructions of a computer program which, when executed by one or more processors, performs the method of the invention. Another embodiment of the apparatus comprises a computer system comprising one or more processors and memory configured to execute a computer program which, when executed, performs the method of the invention.

24 Claims, 12 Drawing Sheets

| SPELLING RULES TABLE ||
| WORD(S) | RULE |
| --- | --- |
| RECEIVE<br>RECEIPT<br>RELIEVE<br>BELIEVE<br>BELIEF<br>REPRIEVE<br>DECEIVE<br>DECEIT | I BEFORE E EXCEPT AFTER C |

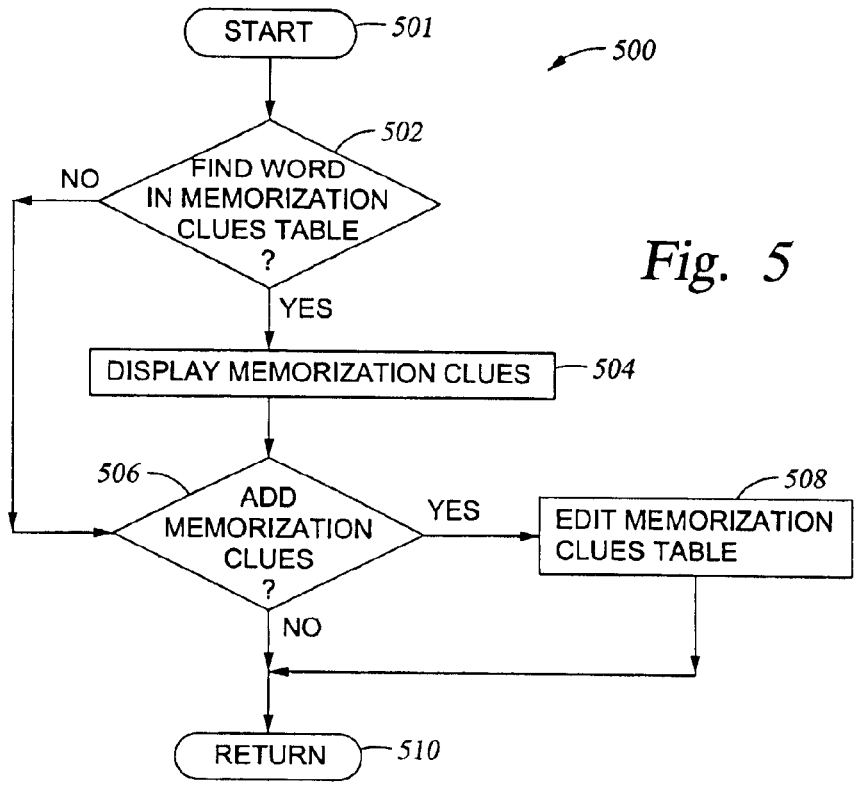

ROOT WORDS TABLE 1001

| WORD | ROOT | OTHER WORDS WITH SAME ROOT | DEFINITION | USAGE |
|---|---|---|---|---|
| ... | ... | ... | ... | ... |
| FAMILIAR | FAMILY FAMILIA | FAMILIAL FAMILIARIZE FAMILIARITY | CLOSELY ACQUAINTED OR INTIMATE; WELL KNOWN, AS IN A FAMILY | A FAMILIAR CONVERSATION |
| ... | ... | ... | ... | ... |
| REPUTABLE | REPUTE REPUTARE | REPUTATION REPUTED | ENJOYING GOOD REPUTE; HELD IN ESTEEM | A REPUTABLE CITIZEN |
| ... | ... | ... | ... | ... |

*Fig. 10*

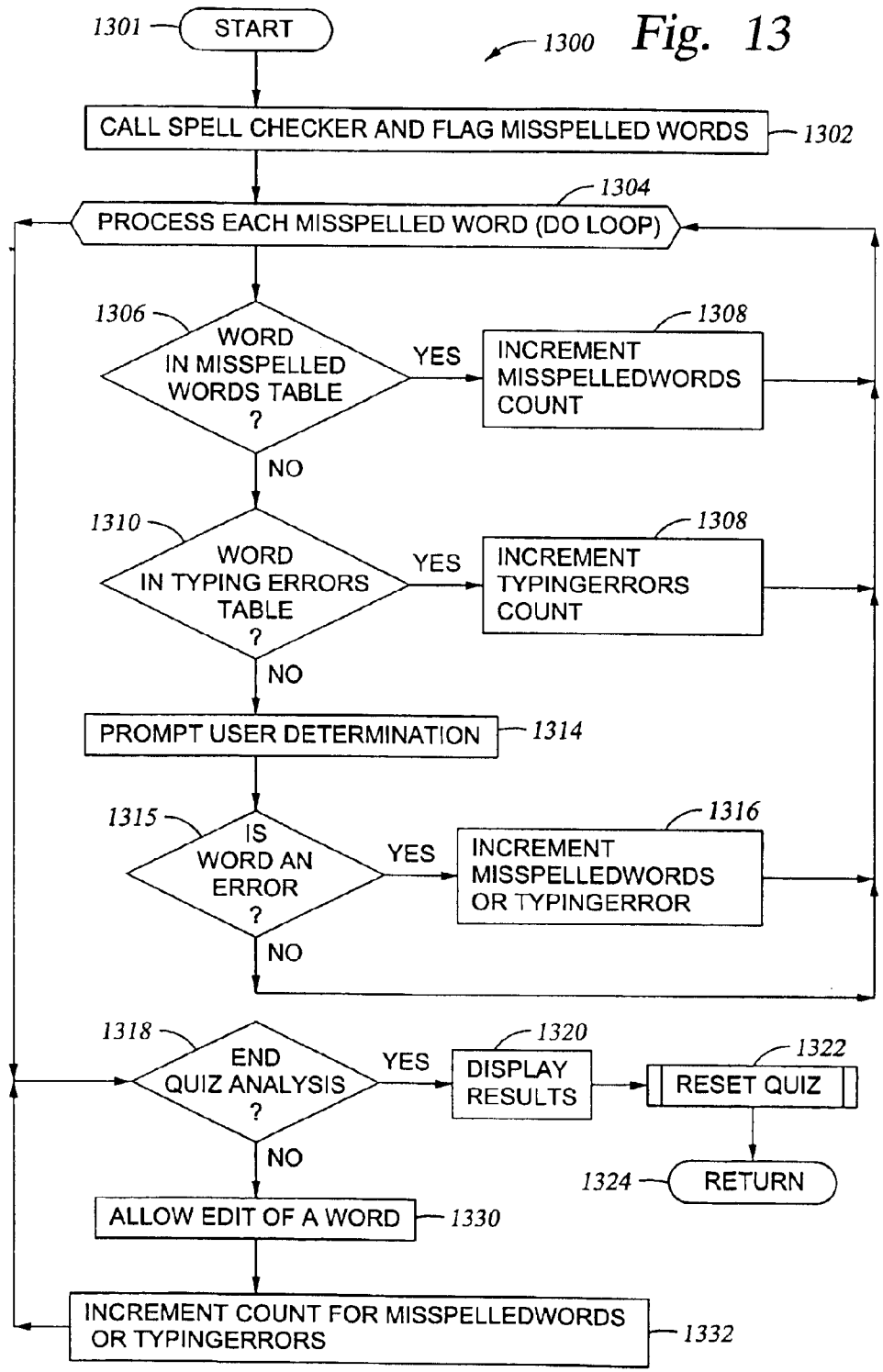

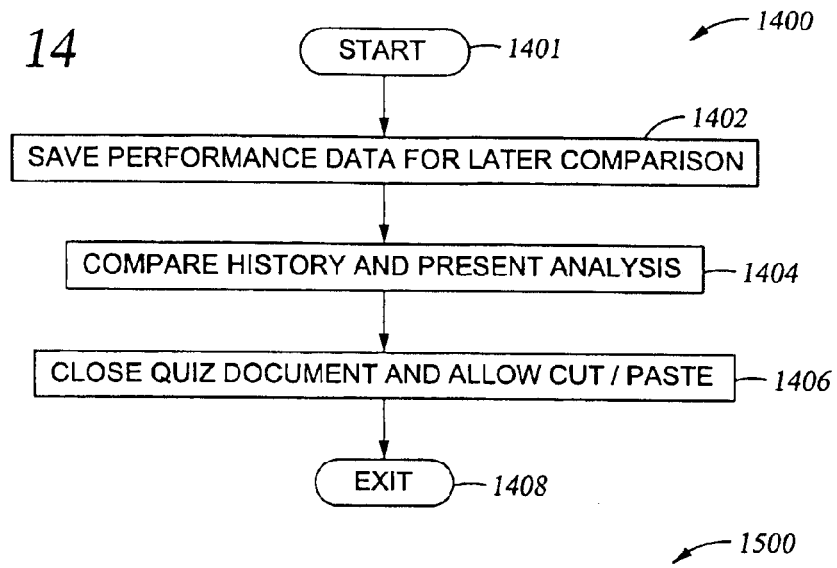

Fig. 14

```
START — 1401
  ↓
SAVE PERFORMANCE DATA FOR LATER COMPARISON — 1402
  ↓
COMPARE HISTORY AND PRESENT ANALYSIS — 1404
  ↓
CLOSE QUIZ DOCUMENT AND ALLOW CUT / PASTE — 1406
  ↓
EXIT — 1408
```

1400

| MISSPELLED WORDS TABLE | | | |
|---|---|---|---|
| WORD(S) | TOTAL COUNT | MISSPELLINGS VARIANTS | COUNT |
| BUREAUCRACY | 11 | BEAURACRACY<br>BEAURACRASY<br>BEURACRACY<br>BUERACRACY | 1<br>2<br>1<br>7 |
|  |  |  |  |

Fig. 15

| TYPING ERRORS TABLE | | |
|---|---|---|
| MISSTYPED VARIATIONS | CORRECT WORD | COUNT |
| HELPIN<br>CRYIN<br>SFTER<br>ANZIOUS<br>AROUN | HELPING<br>CRYING<br>AFTER<br>ANXIOUS<br>AROUND | 1<br>2<br>2<br>3<br>4 |
|  |  |  |

Fig. 16

EDUCATIONAL SPELL CHECKER

BACKGROUND OF THE INVENTION

1. Field of the Invention

The present invention generally relates to apparatus having spell checking capabilities. More particularly, the invention relates to a spell checker that provides educational spelling assistance to a user.

2. Background of the Related Art

Spell checking programs are commonly incorporated into word processing programs as well as many other programs involving typing words to form a part of a document, spread sheet, or database, etc. Current spell checking programs typically check each word in the document against a spelling dictionary database. If the word does not exist in a spelling dictionary database (i.e., a misspelled word), the spell checking program provides a list of correctly spelled words that may be selected to replace the misspelled word. A user of the spell checking program selects the correct word which replaces the misspelled word and then proceeds to correct the next misspelled word.

Accordingly, each misspelled word is corrected without any additional reinforcement to learn the correct spelling of the misspelled words. Thus, the user does not improve his spelling ability and continues to misspell words, even with repeated corrections to the same word or a similar group of words.

Therefore, there is a need for a spell checker that provides educational spelling assistance to improve a user's ability to spell words correctly.

SUMMARY OF THE INVENTION

The invention provides a spell checker that provides spelling educational assistance to improve a user's ability to spell words correctly. Method and apparatus for improving a user's ability to spell words correctly are provided.

In one aspect, the method comprises: displaying a word list for user selection of a correctly spelled word; and displaying assistance information associated with the correctly spelled word. In one embodiment, the assistance information is selected from: one or more root words; one or more related words; and one or more memorization clues.

In another aspect, the apparatus comprises a signal bearing medium containing instructions of a computer program which, when executed by one or more processors, performs a method comprising: displaying a word list for user selection of a correctly spelled word; and displaying assistance information associated with the correctly spelled word.

In another aspect, an apparatus comprises a computer system comprising one or more processors and memory configured to execute a computer program which, when executed, performs a method comprising: displaying a word list for user selection of a correctly spelled word; and displaying assistance information associated with the correctly spelled word.

BRIEF DESCRIPTION OF THE DRAWINGS

So that the manner in which the above recited features, advantages and objects of the present invention are attained and can be understood in detail, a more particular description of the invention, briefly summarized above, may be had by reference to the embodiments thereof which are illustrated in the appended drawings.

It is to be noted, however, that the appended drawings illustrate only typical embodiments of this invention and are therefore not to be considered limiting of its scope, for the invention may admit to other equally effective embodiments.

FIG. 5 is a flow chart illustrating one embodiment of a Memorization Clues subroutine 500.

FIG. 6 is a data structure illustrating one embodiment of a Memorization Clues Table 600.

FIG. 10 is data structure illustrating one embodiment of a Root Words Table 1000.

FIG. 13 is a flow chart illustrating one embodiment of a Quiz Analysis subroutine 1300 of the invention.

FIG. 14 is a flow chart illustrating one embodiment of a Reset Quiz subroutine 1400 of the invention.

FIG. 15 is a data structure illustrating one embodiment of a Misspelled Word Table 1500 of the invention.

FIG. 16 is a data structure illustrating one embodiment of a Typing Errors Table 1600 of the invention.

DETAILED DESCRIPTION OF THE PREFERRED EMBODIMENT

The present invention provides an educational spell checker that can be used to improve a user's ability to spell words correctly. Generally, the educational spell checker of the invention provides spelling educational assistance when a misspelled word is detected by a spell checking program. The spelling educational assistance may include one or more of the following features: providing one or more root words of the correctly spelled word (e.g., associated Greek, Latin, and French root words); providing related words, definitions and/or usage; providing mnemonics or memorization clues; providing practice exercises; identifying typing proclivities or frequent typing errors; providing an analysis of a user's spelling abilities.

The educational spell checker can be embodied in a computer software program or directly into a computer's hardware. As will be described in detail below, one embodiment of the invention is implemented as a program product for use with a computer system such as, for example, a personal computer, a handheld/portable computer, etc. The educational spell checker may be run as part of a spell checking program or as an automatic check-as-you-type spell checker program. The program(s) of the program product defines functions of the preferred embodiment and can be contained on a variety of signal/bearing media, which include, but are not limited to, (i) information permanently stored on non-writable storage media, (e.g., read-only memory devices within a computer such as CD-ROM disks readable by a CD-ROM drive); (ii) alterable information stored on writable storage media (e.g., floppy disks within a diskette drive or hard-disk drive); or (iii) information conveyed to a computer by a communications medium, such as through a computer or telephone network, including wireless communications. Such signal-bearing media, when carrying computer-readable instructions that direct the functions of the present invention, represent embodiments of the present invention.

Figure 1:
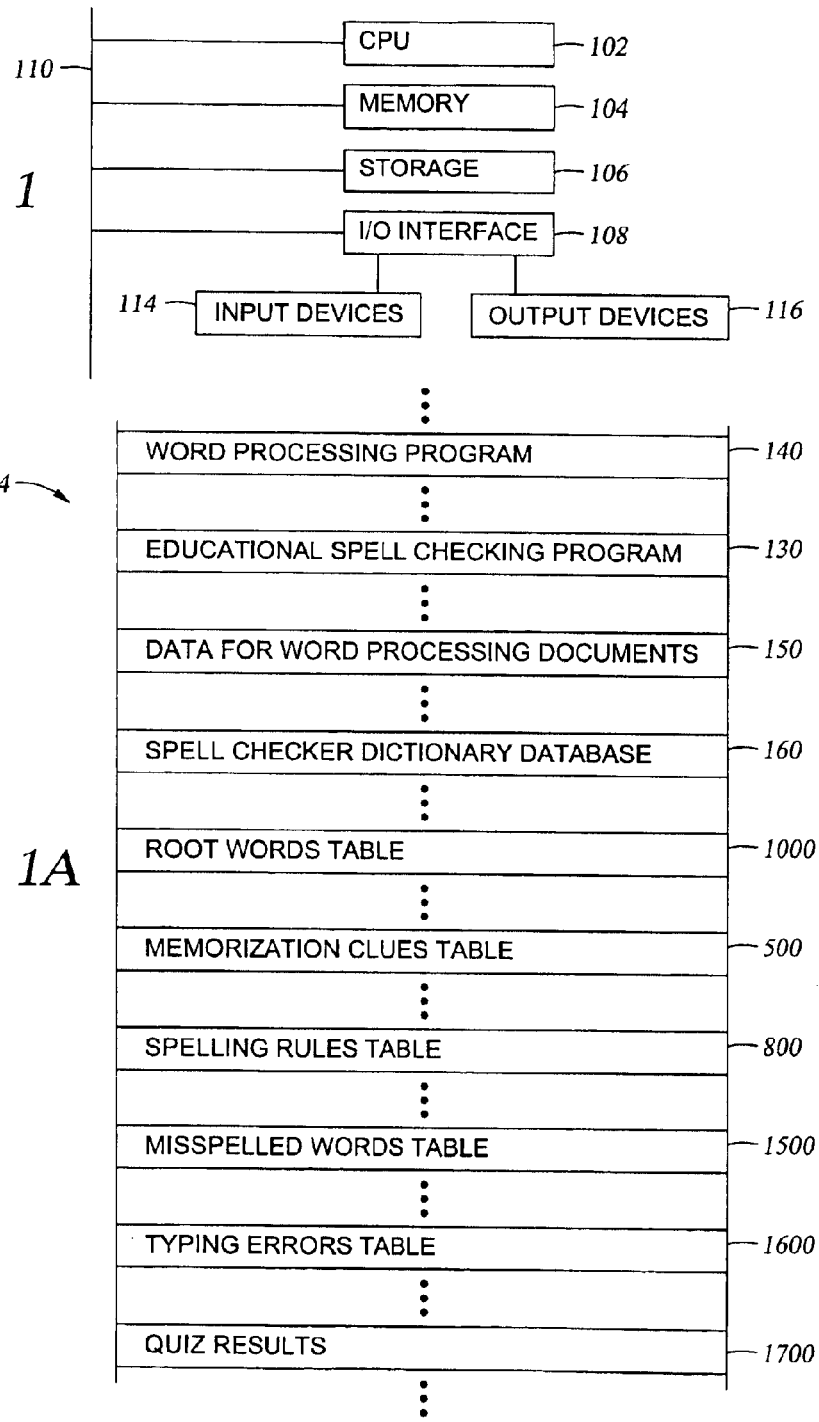
FIG. 1 is a schematic representation of a computer system 100 useful for implementing an educational spell checker of the invention.

FIG. 1 is a schematic representation of a computer system 100 useful for implementing an educational spell checker. The computer system 100 generally includes a central processing unit (CPU) 102, memory 104, storage 106, an I/O (input/output) interface 108. The components of the computer system 100 are connected by a bus line 110 which facilitates transfer of data, commands, etc., between the components. The I/O interface 108 may be any entry/exit device adapted to control and synchronize the flow of data into and out of the CPU 102 from and to peripheral devices such as input devices 114 and output devices 116. The input devices 114 can be any device adapted to provide input to the computer system 100. For example, a keyboard, keypad, light pen, touch screen, button, mouse, trackball or speech recognition unit could be used as one or more input devices connected to the I/O interface 108. The output devices 116 may include a graphics/text display, sound systems, etc. Although shown separately from the input devices 114, the output devices 116 and the input devices 114 could be combined. For example, a display screen with an integrated touch screen and a display with an integrated key word, or a recognition unit combined with a text speech converter could be used.

Memory 104 is preferably a random access memory (RAM) sufficiently large to hold the necessary programming and data structures of the invention. While memory 104 is shown as a single entity, it should be understood that memory 104 may comprise a plurality of modules, and that the memory 104 may exist at multiple levels, from high speed registers and caches to lower speed but larger DRAM chips. The contents of memory 104 can be loaded from and stored to the storage 106 as needed by the CPU 102.

Storage 106 can be any known or unknown storage medium including a Direct Access Storage Device (DASD), a floppy disk drive, an optical storage device and the like. Although storage 106 is shown as a single unit, it could be any combination of fixed and/or removable storage devices, such as fixed disk drivers, floppy disk drivers, tape drives, removable memory cards, or optical storage. Memory 104 and storage 106 could be part of one virtual address space spanning multiple primary and secondary storage devices. Although not shown, the storage 106 may also include configuration settings for the computer system 100.

The data structures utilized for the educational spell checker of the invention may be stored in memory 104 and/or storage 106. The memory/storage may contain data structures including: a spell checker dictionary database 160, a Root Words Table 1000 (may be incorporated into the spell checker dictionary database 160), a Memorization Clues Table 500, a Spelling Rules Table 800, a Misspelled Words Table 1500, a Typing Errors Table 1600, and Quiz Results 1700. Data or records in these data structures are utilized and stored as described below. The memory/storage also contains the instruction of the educational spell checking program 130, instructions for a word processing program 140 utilized with the educational spell checking program 130, data for documents 150, and other data or instructions.

The foregoing embodiments are merely illustrative. It is understood that the one or more of the components of the computer system 100 shown in FIG. 1 may be combined. Furthermore, the computer system 100 may include additional or alternative components according to a particular implementation.

Figures 2, 8:
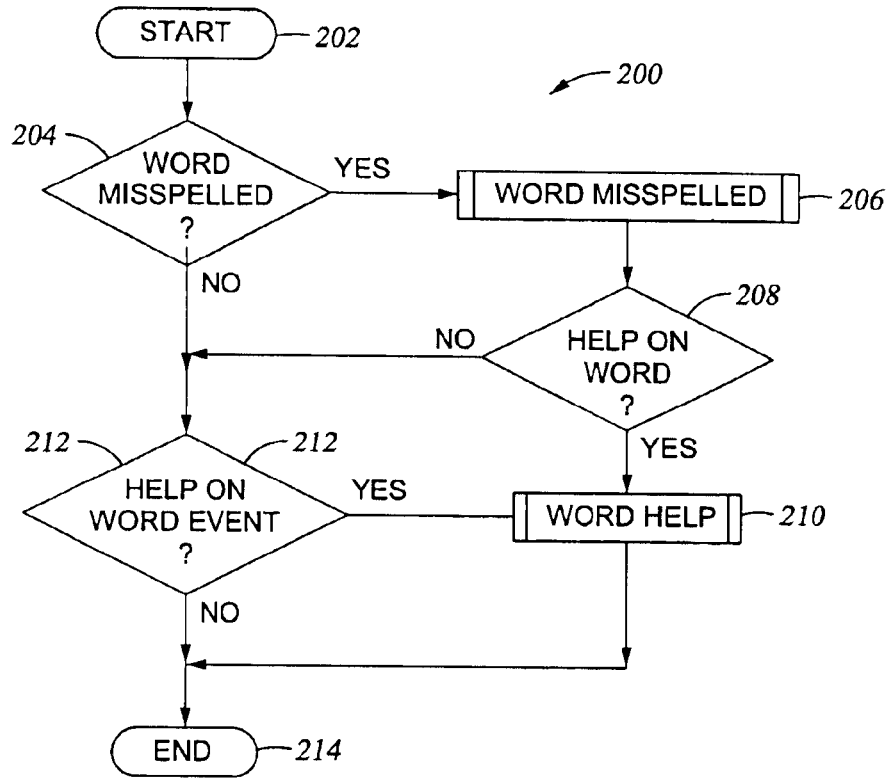
FIG. 2 is a flow diagram illustrating one embodiment of an educational spell checking process 200 of the invention.
FIG. 8 is data structure illustrating one embodiment of a Spelling Rules Table 800.

FIG. 2 is a flow diagram illustrating one embodiment of an educational spell checking process 200 of the invention. The process 200 begins at step 202 in a normal edit mode of a word processing program during which words are inputted into a document by a user. In one embodiment, during this normal edit mode, the educational spell checking program is running concurrently with the word processing program to provide on-the-fly (i.e., as each word is entered) spell checking of words inputted into the document. Although the process 200 is described as part of a word processing program having on-the-fly spell checking capabilities, the invention contemplates applications for spell checking words in a whole document as well as one or more selected portions of a document. In another embodiment, the educational spell checker of the invention can be activated by user command input, for example, by selecting from a pull-down menu or by clicking a short-cut button, and each word in the selected document or selected portion of a document is processed through the educational spell checking process 200 of the invention.

At step 204, each word inputted into the document is checked for correctness in spelling. Conventional spell checking methods may be utilized to determine whether the word is spelled correctly. For example, the word may be checked against a spelling dictionary (i.e., a database of correctly spelled words), and if the word does not match any records in the spelling dictionary, the word is determined as being a misspelled word. If the word is misspelled, the process 200 proceeds to step 206, where the misspelled word is processed through a Word Misspelled subroutine as described in detail below with respect to FIG. 3. After the Word Misspelled subroutine has been performed, a user prompt is displayed at step 208 to allow user selection of whether Word Help (i.e., educational spelling assistance) is desired. If Word Help is selected, a Word Help subroutine is performed at step 210 as described below with respect to FIG. 4. After the Word Help subroutine has been performed, the process 200 ends at step 214, and the word processing program continues in normal edit mode.

If the word is not misspelled at step 202 or the user elects not to receive Word Help at step 208, the process 200 proceeds to step 212 where the Word Help subroutine can be triggered by a user input (e.g., by selecting from a pull-down menu or by clicking a short-cut button). If triggered, the process 200 proceeds to perform the Word Help subroutine at step 210 as described below with respect to FIG. 4. After the Word Help subroutine has been performed, the process 200 ends at step 214, and the word processing program continues in normal edit mode. If the user does not input a signal to trigger the Word Help subroutine at step 212, the process 200 ends at step 214, and the word processor program continues in normal edit mode.

Figure 3:
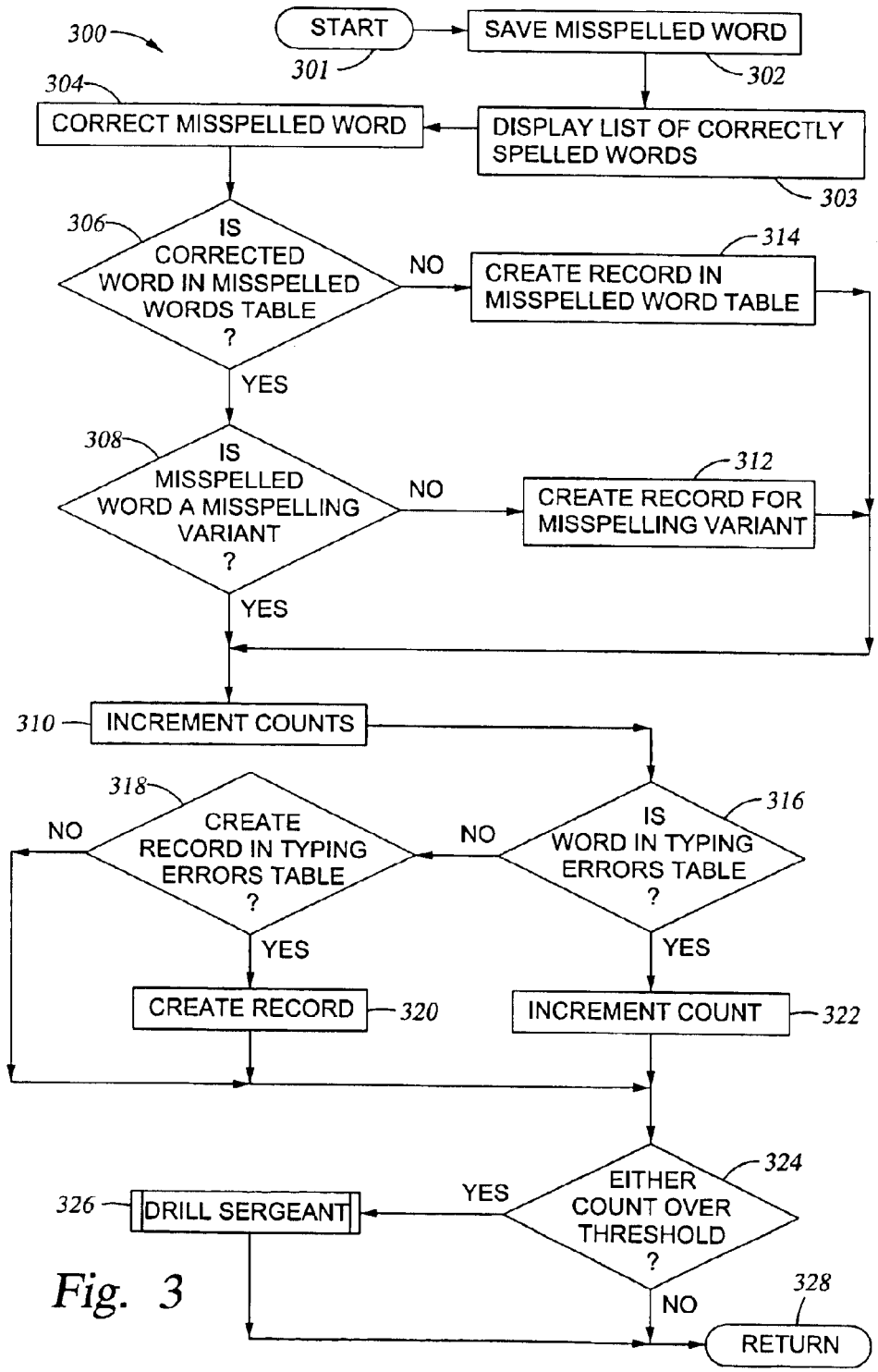
FIG. 3 is a flow chart illustrating one embodiment of a Word Misspelled subroutine 300 of the invention.

One embodiment of the Word Misspelled subroutine (performed in step 206) is illustrated in FIG. 3. The Word Misspelled subroutine 300 corrects the misspelled word and provides a count of the type of error. The Word Misspelled subroutine 300 begins at step 301 and proceeds to step 302 by saving the misspelled word in memory 104. Then, a list of correctly spelled words is displayed to the user for selection of the correctly spelled word to replace the misspelled word in the document at step 303. The user may select one of the displayed words or enter a user input word to replace the misspelled word. The misspelled word is then replaced at step 304 by a correctly spelled word from either the list or user input. The Word Misspelled subroutine 300 then determines, at step 306, whether the correctly spelled word is included in a record in the Misspelled Word Table 1500 (described below). If so, a determination is made as to whether the misspelled word exists as a misspelling variant for the correctly spelled word in step 308.

FIG. 15 is a data structure illustrating one embodiment of a Misspelled Word Table 1500 of the invention. Each record in the Misspelled Word Table 1500 may include a word field 1502 for the correctly spelled word, a total count field 1504 containing the number of misspelling occurrences for the correctly spelled word, a misspelling variants field 1506, and a count field 1508 containing the number of occurrences for each misspelling variant. The misspelling variants field 1506 contain misspelled variations of the correctly spelled word in the word field 1502. For example, as shown in FIG. 15, the correctly spelled word "bureaucracy" has a total of 11 misspelling occurrences with misspelling variants of "beauracracy" once, "beauracrasy" twice, "beuracracy" once, and "bueracracy" seven times.

If a record for the correctly spelled word already exists in the Misspelled Word Table 1500 with the misspelled word as a misspelling variant, the count (contained in field 1504) of the number of misspelling occurrences for the correctly spelled word is incremented by one (1), and the count (contained in field 1508) of the number of occurrence for the misspelling variant is also incremented by one (1), at step 310. If a record for the correctly spelled word already exists in the Misspelled Word Table 1500 with at least one other misspelling variant but without the misspelled word as a misspelling variant, the misspelled word is added to the misspelling variants field 1506 as a new misspelled variation of the correctly spelled word at step 312. If a record for the correctly spelled word does not exist in the Misspelled Word Table 1500, an entry for the correctly spelled word and the misspelling variant is created in the Misspelled Word Table at step 314. In either case after step 312 and step 314, the subroutine 300 proceeds to increment, by one (1), the count of the number of misspelling occurrences for the correctly spelled word and the count of the number of occurrences for the misspelling variant at step 310.

The subroutine 300 then proceeds to determine, at step 316, whether the misspelled word exists in a Typing Errors Table 1600. FIG. 16 is a data structure illustrating one embodiment of a Typing Errors Table 1600 of the invention. Each record in the Typing Errors Table 1600 includes a mistyped word field 1602, a correctly spelled word field 1604 and a count field 1606 for number of occurrences of the typing error. If the misspelled word does not exist in the Typing Errors Table 1600, the user is prompted at step 318 to create an entry in the Typing Errors Table 1600. If the user determines that the error is a mistyped word and selects to create an entry in the Typing Errors Table 1600, an entry is created at step 320 with the correctly spelled word and the associated mistyped word having count of one (1). If the misspelled word exists in the Typing Errors Table 1600, the count of the record for the mistyped word is incremented by one (1) at step 322.

The subroutine 300 then proceeds to step 324 to determine whether either of the count in the Typing Errors Table 1600 or the count in the Misspelled Words Table for the correctly spelled word exceeds a threshold number for triggering a Drill Sergeant subroutine, which is described below with respect to FIG. 11. The threshold number may have a default setting, for example, twenty (20), or a user defined number to set the minimum number of occurrence for a misspelled word before the Drill Sergeant subroutine is triggered. If either count exceeds the threshold number at step 324, the Drill Sergeant subroutine is triggered at step 326, and then proceeds to return at step 328 back to the process 200. If neither count exceeds the threshold number, the subroutine 300 returns to process 200 at step 328 and continues on to step 208.

Figure 4:
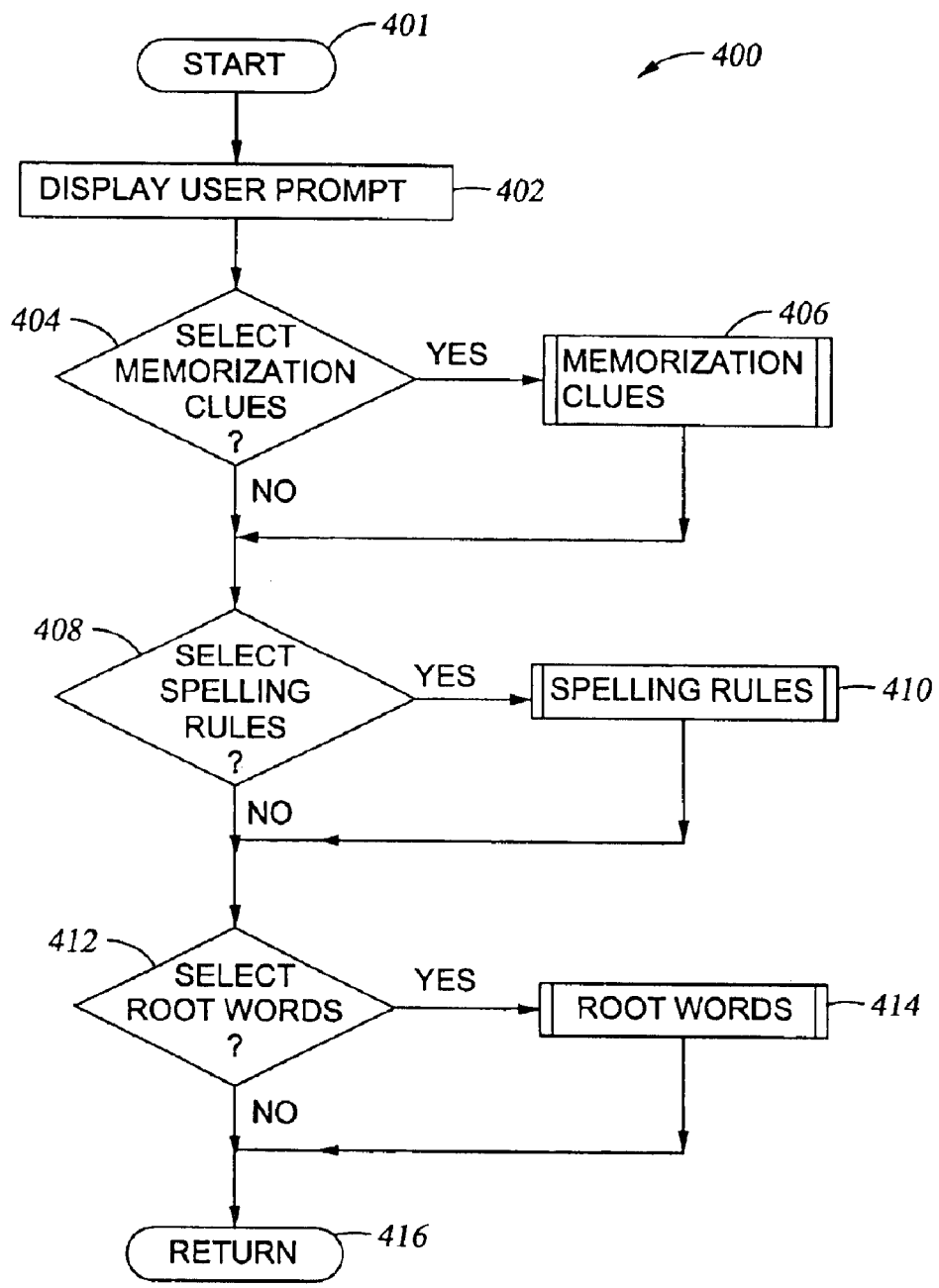
FIG. 4 is a flow chart illustrating one embodiment of a Word Help subroutine 400 of the invention.

Referring now to FIG. 4, a flow chart illustrating one embodiment of a Word Help subroutine 400 of the invention is shown. The Word Help subroutine 400 (performed in step 210) begins at step 401 and proceeds to step 402 by displaying a user prompt to select one type of educational spelling assistance. In one embodiment, a pop-up window provides user selection buttons for the following types of educational spelling assistance: Memorization Clues, Spelling Rules and Root Words. At step 404, the Word Help subroutine 400 determines whether the user has selected to view Memorization Clues. If so, a Memorization Clues subroutine 500 (described below in FIG. 5) is performed at step 406 subroutine 400, and then the Word Help subroutine 400 proceeds to step 408. Otherwise, the Word Help subroutine 400 proceeds to step 408. At step 408, the Word Help subroutine 400 determines whether the user has selected to view Spelling Rules. If so, the Spelling Rules subroutine 700 (described below in FIG. 7) is performed at step 410, and then the Word Help subroutine 400 proceeds to step 412. Otherwise, the Word Help subroutine 400 proceeds to step 412. At step 412, the Word Help subroutine 400 determines whether the user has selected to view Root Words. If so, the Root Words subroutine 900 (described below in FIG. 9) is performed at step 414, and then the Word Help subroutine 400 proceeds to step 416. Otherwise, the Word Help subroutine 400 proceeds to step 416. At step 416, the Word Help subroutine 400 ends and returns to process 200 which continues with the word processor program in normal edit mode.

FIG. 5 is a flow chart illustrating one embodiment of a Memorization Clues subroutine 500 which is performed in step 406. The Memorization Clues subroutine 500 begins at step 502 to look for the correctly spelled word in a Memorization Clues Table 600. FIG. 6 is a data structure illustrating one embodiment of a Memorization Clues Table 600. The Memorization Clues Table 600 includes a word field 602 which may contain one or more words such as words sharing the same root word, and memorization clue field 604 which contains one or more memorization clues or mnemonics for the word(s) in the word field. Each word in the spelling dictionary may be associated with one or more memorization clues, and the Memorization Clues Table 600 may be included as part of or separately from the spelling dictionary database. Each record in the memorization clues database may include one or more words from a family of words (i.e., words having the same root) that share the same memorization clues or nifty ways to remember. For example, the words "bureaucratic" and "bureaucracy" have two memorization clues listed.

If the correctly spelled word is found in the Memorization Clues Table 600, the Memorization Clues subroutine 500 displays the memorization clues 604 associated with the correctly spelled word at step 504. Then the Memorization Clues subroutine 500 proceeds to display a user prompt to query whether the user wants to add or edit the Memorization Clues Table 600 at step 506. If so, the user is prompted at step 508 to edit existing records in the Memorization Clues Table 600 or create new records in the Memorization Clues Table 600. The Memorization Clues subroutine 500 then proceeds to exit the subroutine at step 510. If the user does not indicate a desire to edit the Memorization Clues Table 600 at step 506, the Memorization Clues subroutine 500 proceeds to exit at step 510.

Referring back to step 502, if the correctly spelled word is not found in the Memorization Clues Table 600, the Memorization Clues subroutine 500 displays a user prompt to query whether the user wants to add or edit the Memorization Clues Table 600 at step 506, as described above. The Memorization Clues subroutine 500 then proceeds to step 508 and/or exit at step 510, as described above.

Figure 7:
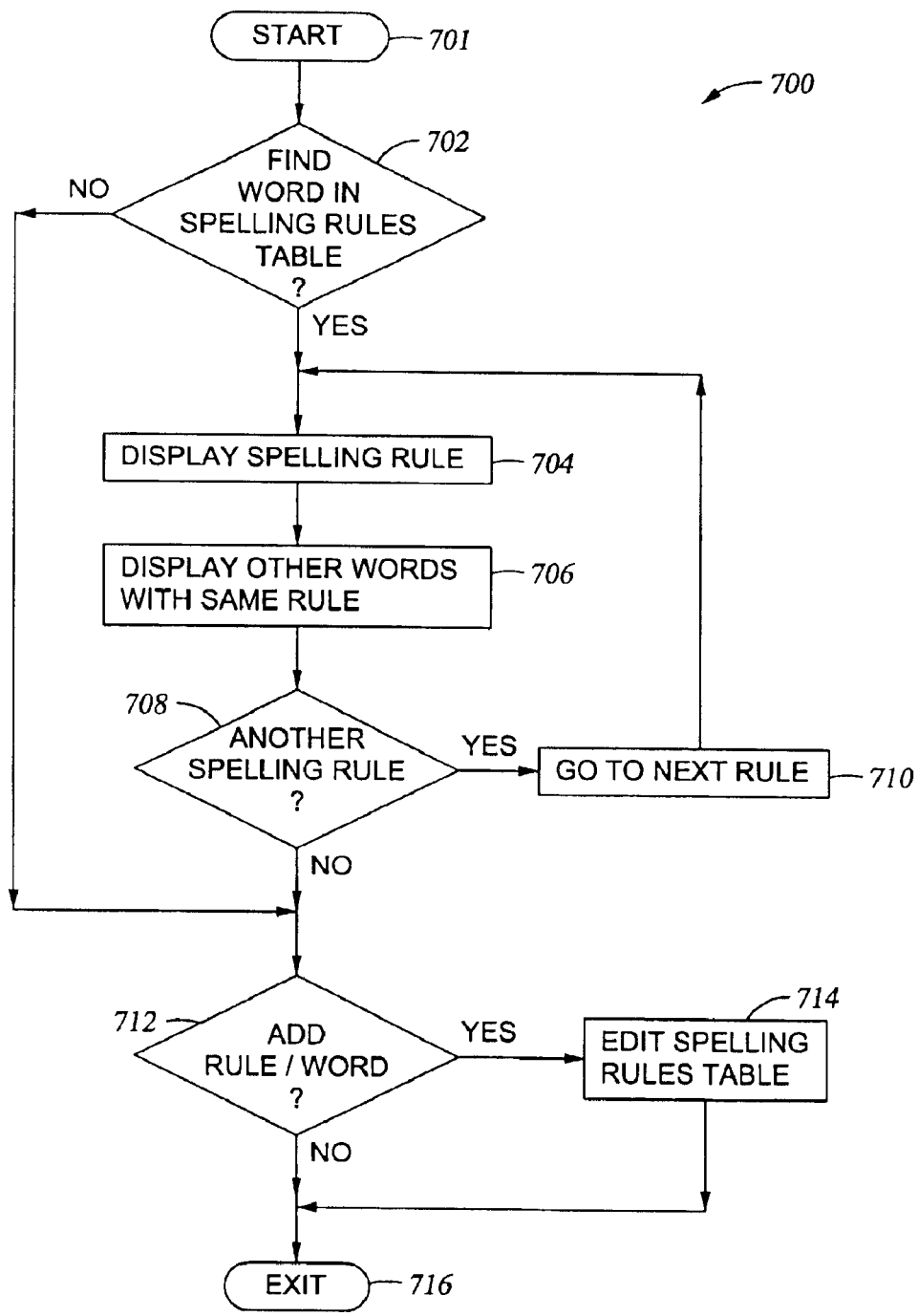
FIG. 7 is a flow chart illustrating one embodiment of a Spelling Rules subroutine 700.

FIG. 7 is a flow chart illustrating one embodiment of a Spelling Rules subroutine 700 which is performed in step 410. The Spelling Rules subroutine 700 begins at step 701 and proceeds to step 702 to look for the correctly spelled word in a Spelling Rules Table 800. FIG. 8 is data structure illustrating one embodiment of a Spelling Rules Table 800. The Spelling Rules Table 800 may be included as part of or separately from the spelling dictionary database. Each record in the Spelling Rules Table 800 includes a word field 802 containing one or more words and a rule field 804 containing one or more spelling rules associated with the word(s). Particular groups of words may have particular spelling rules that govern the way those words are spelled. For example, as shown in FIG. 8, the words listed share the spelling rule "i before e except after c." If the correctly spelled word is found in the Spelling Rules Table 800, the Spelling Rules subroutine 700 displays the spelling rule 804 associated with the correctly spelled word at step 704. The Spelling Rules subroutine 700 may also display other words having the same spelling rule in step 706.

The Spelling Rules subroutine 700 then determines whether the correctly spelled word has another associated spelling rule at step 708. If so, the Spelling Rules subroutine 700 points to the next rule associated with correctly spelled word at step 710 and displays that rule in step 704. After all rules have been displayed, the Spelling Rules subroutine 700 proceeds to display a user prompt to query whether the user wants to add or edit the Spelling Rules Table 800 at step 712. If so, the user is prompted at step 714 to edit existing records or create new records in the Spelling Rules Table 800. For example, the user may add rules to the Spelling Rules Table 800, add words for the same rule, or edit existing records. The Spelling Rules subroutine 700 then proceeds to exit the subroutine at step 716. If the user does not indicate a desire to edit the Spelling Rules Table 800 at step 712, the Spelling Rules subroutine 700 proceeds to exit at step 716.

Referring back to step 702, if the correctly spelled word is not found in the Spelling Rules Table 800, the Spelling Rules subroutine 700 displays a user prompt to indicate whether the user wants to add or edit the Spelling Rules Table 800 at step 712, as described above. The Spelling Rules subroutine 700 then proceeds to step 714 and/or exit the Spelling Rules subroutine 700 at step 716.

Figure 9:
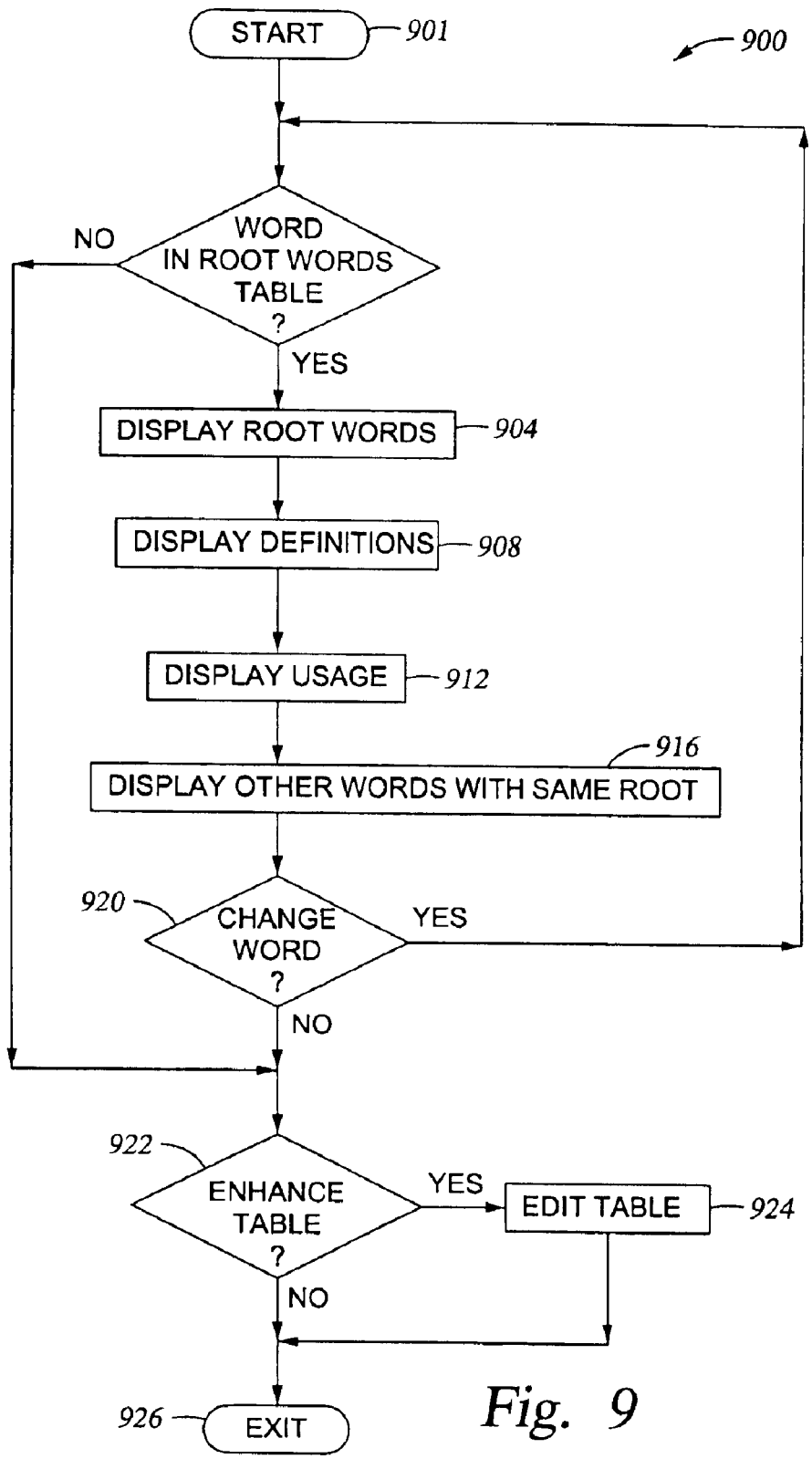
FIG. 9 is a flow chart illustrating one embodiment of a Root Words subroutine 900.

FIG. 9 is a flow chart illustrating one embodiment of a Root Words subroutine 900 which is performed in step 414. The Root Words subroutine 900 begins at step 901 and proceeds to step 902 to look for the correctly spelled word in a Root Words Table 1000. FIG. 10 is data structure illustrating one embodiment of the Root Words Table 1000. The Root Words Table 1000 may be included as part of or separately from the spelling dictionary database. Each word in the spelling dictionary may be associated with a root word from the Root Words Table 1000. The Root Words Table 1000 may be included as part of or separately from the spelling dictionary database. Each root word record in the Root Words Table 1000 may include the following fields or categories: a word field 1001 containing one or more words, a root words field 1002 containing one or more root words from one or more languages (e.g., Latin, French, English, etc.), a related words field 1004 containing one or more related words having the same root word, a definitions field 1004 containing one or more definitions of the word, and a usage field 1006 containing one or more usage of the word. FIG. 10 shows examples of root word records for the words "familiar" and "reputable."

If the correctly spelled word is found in the Root Words Table 1000, the Root Words subroutine 900 displays, in a pop-up window, for example, the information contained in each root word record. In one embodiment, all fields or categories of the root word record are displayed. In another embodiment, a pop-up window displays one or more categories of the root word record and provides user selection of the remaining categories. In yet another embodiment, the Root Words subroutine 900 provides user selection of which fields or categories are to be displayed.

As shown in FIG. 9, the Root Words subroutine 900 displays the root word(s) 1002 at step 904, displays the definition 1006 at step 908, displays the usage 1008 at step 912, and displays the related words 1004 at step 916. After the one or more related words 1004 having the same root word is displayed in step 916, the Root Words subroutine 900 provides a user option to select one of the related words at step 920. If the user selects one of the related words, the Root Words subroutine 900 returns to step 902 to look for the selected word in the Root Words Table 1000 and displays the information associated with the selected word. The Root Words subroutine 900 then proceeds through step 904, step 908, step 912, step 916 and step 920, as described above, for the newly selected word.

At step 920, if the user does not select a word, the Root Words subroutine 900 proceeds to display a user prompt to query whether the user wants to add or edit the Root Words Table 1000 at step 922. If so, the user is prompted at step 924 to edit existing records or create new records in the Root Words Table 1000. The Root Words subroutine 900 then proceeds to exit the subroutine at step 926. If the user does not indicate a desire to make changes to the Root Words Table 1000 at step 922, the Root Words subroutine 900 proceeds to exit at step 926.

Referring back to step 902, if the correctly spelled word is not found in the Root Words Table 1000, the Root Words subroutine 900 displays a user prompt to query whether the user wants to add or edit the Root Words Table 1000 at step 922, as described above. The Root Words subroutine 900 then proceeds to step 924 and/or exit at step 926, as described above.

Figure 11:
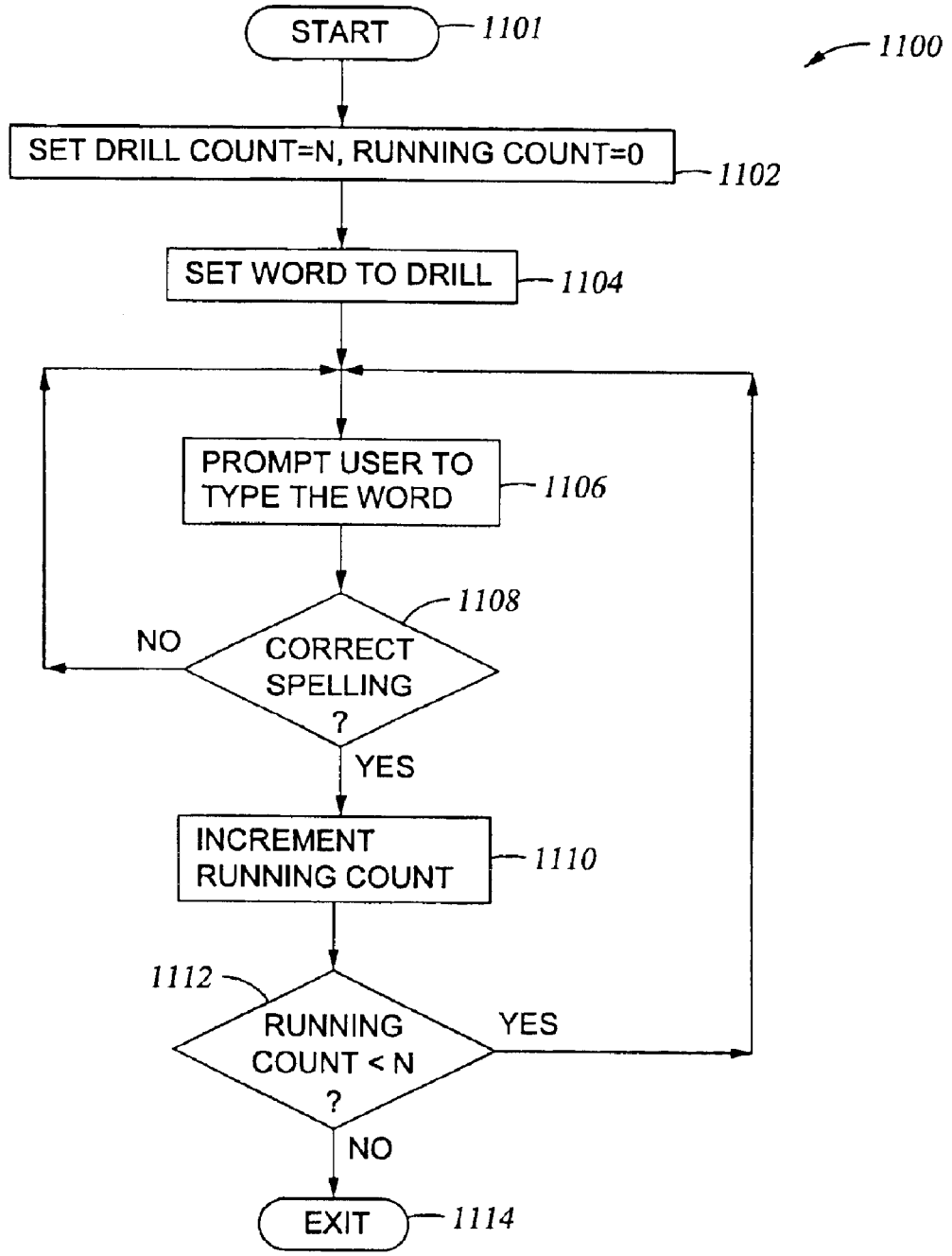
FIG. 11 is a flow chart illustrating one embodiment of a Drill Sergeant subroutine 1100.

FIG. 11 is a flow chart illustrating one embodiment a Drill Sergeant subroutine 1100 which is performed in step 326. The Drill Sergeant subroutine 1100 is executed when occurrence of a particular misspelling or a typing error exceeds a threshold number. The Drill Sergeant subroutine 1100 allows a user to practice drill exercises and reduce tendencies to make the same spelling error or typing error in the future.

The Drill Sergeant subroutine 1100 begins at step 1101 and proceeds to step 1102 by setting a drill count equal to N and setting a drill running count equal to zero. The drill count number N may be set by a default setting (e.g., 20) or by a user input option. The drill count represents the number of times a drill exercise (e.g., typing a word) is to be repeated, and the drill running count represents the number of times the drill exercise has been completed. The Drill Sergeant subroutine 1100 then sets the correctly spelled word as the word for the drill exercise (i.e., drill word) at step 1104. The correctly spelled word may also be retrieved from the Misspelled Words Table or the Typing Errors Table. At step 1106, the user is prompted to type the drill word, and at step 1108, the user typed word is evaluated for correct spelling. If the user typed word is incorrectly spelled (i.e., does not correctly spell the word for the drill exercise), the user is prompted again to type the drill word at step 1106. If the user typed word is correctly spelled, the drill running count is incremented by one (1) at step 1110, and a comparison of the drill running count and the drill count N is performed at step 1112 to determine whether the drill exercise has been completed N number of times. If the drill running count is less than the drill count N, the user is prompted again to type the drill word at step 1106 and continue the drill exercise. If the running count is equal to or greater than the drill count N at step 1112, the Drill Sergeant subroutine 1100 proceeds to exit the subroutine at step 1114, which returns to step 328 in FIG. 3.

Figure 12:
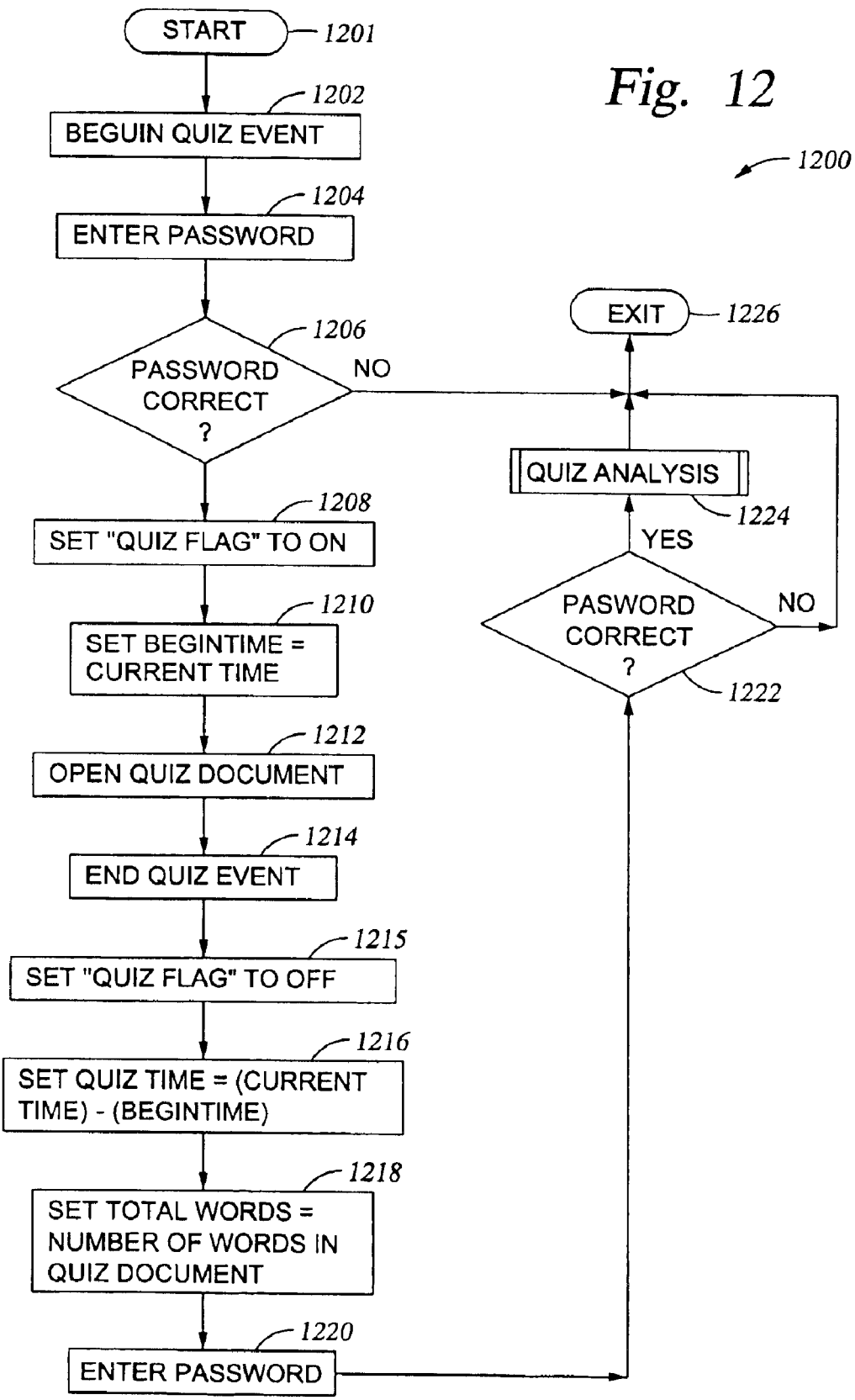
FIG. 12 is a flow chart illustrating one embodiment of a Quiz subroutine 1200 of the invention.

In another embodiment of the invention, the educational spell checker provides a Quiz subroutine that may be utilized to evaluate the spelling ability of a user of the word processing program. The Quiz subroutine may be particularly useful in a classroom situation to evaluate students' spelling ability or typing ability. FIG. 12 is a flow chart illustrating one embodiment of a Quiz subroutine 1200 of the invention. The Quiz subroutine 1200 may be called or activated by the user of the word processing program in normal edit mode through a pull down menu, a link button or other input icons.

Once a command is received to begin the quiz event at step 1202, the user is prompted for a password at step 1204. The password may be used to identify the user or the quiz taker so that the quiz results may be saved in the user's performance history. The password feature may also be used by a teacher to control quiz events, quiz results, and quiz results history for particular students.

At step 1206, the password is evaluated for validity. If the password is invalid or incorrect, the Quiz subroutine is terminated at step 1226. Alternatively, the user is prompted to select from options for entering password again, creating a password and associated user profile, or exiting the Quiz subroutine. If the password is valid, the Quiz subroutine sets a quiz flag to an "ON" position at step 1208, and sets the current time at step 1210 as the BeginTime variable. The BeginTime variable is used to measure the amount of time the quiz taker used to complete the quiz. Once the quiz flag is on, the word processor operates in quiz mode and prevents a user from using the word processor program in the normal mode until the quiz event has ended or has been terminated by the user.

A blank quiz document is opened to begin the quiz at step 1212, and the user is prompted to type in words into the quiz document for analysis at a later time. For example, the quiz taker may listen to a tape recording and type in words heard into the document. Also at step 1212, any currently opened documents may be automatically saved and, optionally closed. After the quiz taker completes the quiz document, the quiz taker enters a command to end the quiz event. Once the end quiz command is received at step 1214, the quiz flag is set to an "OFF" position at step 1215 to end the quiz mode operation of the word processor program.

The time spent for completing the quiz is calculated at step 1216 as the current time minus the BeginTime and saved as QuizTime. The total number of words typed in the quiz document may be calculated and saved as TotalWords in step 1218. The variables Quiz Time and Total Words may be saved in memory 104 as part of Quiz Results 1700.

Then the user is prompted for a password to end the quiz at step 1220. This password feature may be used by a teacher to verify that the student has completed the quiz and to prevent a student from bypassing or terminating the quiz analysis. Although password features have been described with the invention, these passwords feature are optional features that may be selectively activated or deactivated. At step 1222, the password is evaluated for validity. If the password is invalid or incorrect, the Quiz subroutine 1200 proceeds to exit the subroutine at step 1226. Alternatively, if the password is incorrect, the user is prompted again for the password at step 1220, and an exit option may be provided after a number (e.g., 3) of invalid password entries.

If the password is valid or correct at step 1222, the Quiz subroutine proceeds to the Quiz Analysis subroutine 1300 (described below in FIG. 13) at step 1224. After the Quiz Analysis subroutine 1300, the Quiz subroutine 1200 exits the subroutine at step 1226, and the word processor program resumes in normal edit mode.

FIG. 13 is a flow chart illustrating one embodiment of the Quiz Analysis subroutine 1300 which is performed in step 1224. The Quiz Analysis subroutine 1300 begins at step 1301 and proceeds to step 1302 by checking the spelling of each word in the quiz document and flagging each misspelled word. Step 1302 may be performed by checking each word against records in the spelling dictionary database. Each flagged word is then processed in a loop from step 1304 to step 1316 (referred herein as "the loop") to determine the type of error for the flagged word and tabulate the number of errors for each type of errors. Each flagged word may be saved in memory 104 as part of Quiz Results 1700. The data in Quiz Results 1700 may also include count variables MisspelledWords and TypingErrors as described below.

At step 1306, the flagged word is checked against the Misspelled Words Table 1500. If the flagged word is found in the Misspelled Words Table 1500, a count (i.e., the count variable termed MisspelledWords) for misspelled words in the quiz document is incremented by one (1) in step 1308, and the next flagged word is processed in the loop. If the flagged word is not found in the Misspelled Words Table 1500, the flagged word is checked against the Typing Errors Table 1600 at step 1310.

If the flagged word is found in the Typing Errors Table 1600, a count (i.e., the count variable termed TypingErrors) for mistyped words in the quiz document is incremented by one (1) in step 1312, and the next flagged word is processed in the loop. If the flagged word is not found at step 1310 in the Typing Errors Table 1600, the flagged word in the document is highlighted, and the user is prompted at step 1314 to determine whether the flagged word is a misspelled word, a mistyped word or a correctly spelled word. At step 315, if the user determines that the flagged word is neither a misspelled word or a mistyped word, the subroutine 1300 proceeds to step 1304 to process the next flagged word. If the flag word is a spelling error, according to the user selection, the count for MisspelledWords or the count for TypingErrors may be incremented by one (1) in step 1316.

After all flagged words have been categorized and tabulated through the steps in the loop, the user is prompted to end the analysis at step 1318. If the user enters a command to end the analysis, the analysis results (from data in Quiz Results 1700) are displayed to the user at step 1320. The displayed results may include a total number of words in the quiz document, the amount of time for completion of the quiz document, the number of misspelled words, the number of mistyped words, and other information such as a list of flagged words and a percentage of correctly spelled words.

A Reset Quiz subroutine is then performed at step 1322, and the Quiz Analysis subroutine ends at step 1324. One embodiment of a Quiz Reset subroutine is described below with reference to FIG. 14.

Referring back to step 1318, if the user does not want to end the analysis, the user is prompted to select and edit words in the quiz document at step 1330. This manual edit of the quiz document allows the user to pick out words that are not flagged by the spell checker as misspelled words but may be grammatically incorrect. For example, words such as "their" and "there" may be deemed correct by the spell checker even when used incorrectly. At step 1332, the user is prompted to determine whether the selected word is a misspelled word or a mistyped word. According to the user selection, the count for MisspelledWords or the count for TypingErrors may be incremented by one (1) in step 1334. The user is then prompted to end the analysis back at step 1318, and the Quiz Analysis subroutine continues as described above.

FIG. 14 is a flow chart illustrating one embodiment of a Reset Quiz subroutine 1400 which is performed in step 1322. The Reset Quiz subroutine 1400 begins at step 1401 and proceeds to step 1402 by saving the current results of the quiz analysis as performance data for the user as identified by the password. The performance data may be used later for comparison analysis. The user is provided options at step 1404 to compare performance data with current results and perform other analysis such as history, trends, etc. At step 1406, the user is provided options to cut and paste portions or the whole quiz document into another document, and the quiz document is closed thereafter. The Reset Quiz subroutine 1400 then exits at step 1408.

While the foregoing is directed to the preferred embodiment of the present invention, other and further embodiments of the invention may be devised without departing from the basic scope thereof, and the scope thereof is determined by the claims that follow.

What is claimed is:

1. A method for correcting a misspelled word, comprising:
   displaying a word list for user selection of a correctly spelled word to replace the misspelled word;
   upon user selection of the correctly spelled word, displaying one or more categories of assistance information associated with the user-selected correctly spelled word;
   prompting a user to select from the one or more categories of assistance information associated with the user selected correctly spelled word; and
   upon user-selection of a category of assistance information, displaying the assistance information corresponding to the user-selected category of assistance information associated with the user selected correctly spelled word.

2. The method of claim 1, wherein the one or more categories of assistance information is selected from:
   one or more root words;
   one or more spelling rules; and
   one or more memorization clues.

3. The method of claim 1, further comprising:
   replacing the misspelled word with the correctly spelled word selected by the user.

4. The method of claim 1, further comprising:
   replacing the misspelled word with a user input word; and
   storing in memory an association of the user input word as the correctly spelled word for the misspelled word.

5. The method of claim 1, further comprising:
   tracking a number of times the correctly spelled word has been misspelled; and
   when the number exceeds a threshold number, displaying a spelling exercise for user practice.

6. The method of claim 1, further comprising:
   identifying a misspelling pattern associated with the misspelled word; and
   displaying an explanation for correcting the misspelling pattern.

7. The method of claim 6, wherein the misspelling pattern comprises a typing error pattern.

8. The method of claim 1, further comprising:
   analyzing a plurality of words in a document; and
   displaying analysis results comprising at least one of a misspelled words count, a mistyped words count and a percentage of correctly spelled words.

9. A signal bearing medium containing instructions of a computer program which, when executed by one or more processors, performs a method comprising:
   displaying a word list for user selection of a correctly spelled word to replace the misspelled word;
   upon user selection of the correctly spelled word, displaying one or more categories of assistance information associated with the user-selected correctly spelled word;
   prompting a user to select from the one or more categories of assistance information associated with the user selected correctly spelled word; and
   upon user-selection of a category of assistance information, displaying the assistance information corresponding to the user-selected category of assistance information associated with the user selected correctly spelled word.

10. The signal bearing medium of claim 9, wherein the one or more categories of assistance information is selected from:
    one or more root words;
    one or more spelling rules; and
    one or more memorization clues.

11. The signal bearing medium of claim 9, wherein the method further comprises:
    replacing the misspelled word with the correctly spelled word selected by the user.

12. The signal bearing medium of claim 9, wherein the method further comprises:
    replacing the misspelled word with a user input word; and
    storing in memory an association of the user input word as the correctly spelled word for the misspelled word.

13. The signal bearing medium of claim 9, wherein the method further comprises:
    tracking a number of times the correctly spelled word has been misspelled; and
    when the number exceeds a threshold number, displaying a spelling exercise.

14. The signal bearing medium of claim 9, wherein the method further comprises:
   identifying a misspelling pattern associated with the misspelled word; and
   displaying an explanation for correcting the misspelling pattern.

15. The signal bearing medium of claim 14, wherein the misspelling pattern comprising a typing error pattern.

16. The signal bearing medium of claim 9, wherein the method further comprises:
   analyzing a plurality of words in a document; and
   displaying analysis results comprising at least one of a misspelled words count, a mistyped words count and a percentage of correctly spelled words.

17. A computer system comprising one or more processors and memory configured to execute a computer program which, when executed, performs a method comprising:
   displaying a word list for user selection of a correctly spelled word to replace the misspelled word;
   upon user selection of the correctly spelled word, displaying one or more categories of assistance information associated with the user-selected correctly spelled word;
   prompting a user to select from the one or more categories of assistance information associated with the user selected correctly spelled word; and
   upon user-selection of a category of assistance information, displaying the assistance information corresponding to the user-selected category of assistance information associated with the user selected correctly spelled word.

18. The computer system of claim 17, wherein the one or more categories of assistance information is selected from:
   one or more root words;
   one or more spelling rules; and
   one or more memorization clues.

19. The computer system of claim 17, wherein the method further comprises:
   replacing the misspelled word with the correctly spelled word selected by the user.

20. The computer system of claim 17, wherein the method further comprises:
   replacing the misspelled word with a user input word; and
   storing in memory an association of the user input word as the correctly spelled word for the misspelled word.

21. The computer system of claim 17, wherein the method further comprises:
   tracking a number of times the correctly spelled word has been misspelled; and
   when the number exceeds a threshold number, displaying a spelling exercise.

22. The computer system of claim 17, wherein the method further comprises:
   identifying a misspelling pattern associated with the misspelled word; and
   displaying an explanation for correcting the misspelling pattern.

23. The computer system of claim 22, wherein the misspelling pattern comprises a typing error pattern.

24. The computer system of claim 17, wherein the method further comprises:
   analyzing a plurality of words in a document; and
   displaying analysis results comprising at least one of a misspelled words count, a mistyped words count and a percentage of correctly spelled words.

* * * * *